(12) United States Patent
Yang et al.

(10) Patent No.: US 6,401,107 B1
(45) Date of Patent: Jun. 4, 2002

(54) METHOD AND PROCESSOR FOR REDUCING COMPUTATIONAL ERROR IN A PROCESSOR HAVING NO ROUNDING SUPPORT

(75) Inventors: Jian Yang, Mansfield; Keith Conger, Foxborough, both of MA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/433,632

(22) Filed: Nov. 3, 1999

(51) Int. Cl.⁷ .................................................. G06F 7/38
(52) U.S. Cl. ....................................... 708/551; 708/497
(58) Field of Search ................................ 708/551, 550, 708/496, 497

(56) References Cited

U.S. PATENT DOCUMENTS

| | | | | |
|---|---|---|---|---|
| 3,891,837 A | * | 6/1975 | Sunstein | 708/550 |
| 4,727,506 A | * | 2/1988 | Fling | 708/551 |
| 4,750,146 A | * | 6/1988 | Dalqvist | 708/551 |
| 5,894,428 A | * | 4/1999 | Harada | 708/496 |

* cited by examiner

*Primary Examiner*—David H. Malzahn

(57) ABSTRACT

In a chain of linear time-invariant operations (401), all bias introduced between operations collectively produce a total deterministic error at the final output of the chain of operations (401). In the present invention, truncation is used in place of rounding after each operation by simply not rounding in software. Recognizing that all the bias introduced by replacing rounding with truncation results in a single deterministic error at the final output, in the present invention the total bias (403) is predetermined and subtracted from each data sample of the final output sequence.

10 Claims, 4 Drawing Sheets

Prior-Art

METHOD AND PROCESSOR FOR REDUCING COMPUTATIONAL ERROR IN A PROCESSOR HAVING NO ROUNDING SUPPORT

FIELD OF THE INVENTION

The present invention relates generally to processing arithmetic operations with microprocessors and, in particular, to reducing computational error in such processors having no rounding support.

BACKGROUND OF THE INVENTION

Many arithmetic operations performed by microprocessors require extra numeric precision to represent the result of the operation. For example, when multiplying two 16-bit integers, the product may contain 31 valid bits. Microprocessors optimized for signal processing functions typically have hardware support to deal with the precision expansion. For example, some processors store operation results in an accumulator that has a wider word length than the operands, and have special instructions to round the results automatically. Other processors, especially general purpose processors used in personal computers or hand-held devices, usually are not equipped with such special hardware. Conventionally, the method to deal with precision expansion is to compute the results for at least one bit more precision than is required, then perform rounding in software.

To compute a result of an arithmetic operation with excess precision, one can either implement multiple precision arithmetic in software or limit the numerical range of the operands. In the former, multiple registers are banked together to store the result, and in the latter, by not utilizing the entire word length of the register for the operands, extra bits are made available to implement the extra precision. With at least one bit of excess precision, rounding of the result of the arithmetic operation can be performed in software by modifying the result based on the "add-one" principle, i.e., adding 0.5 to the result and setting the bits to the right of the decimal point to zero. (Here, it is assumed that the placement of the decimal point is such that the bits to the right of the decimal point can be ignored for the target precision). It is common knowledge that the quantization noise or rounding error introduced by the above procedure has an average value of zero, i.e., no bias is introduced, under the assumption that the quantization noise is uniformly distributed.

FIG. 1 illustrates the conventional method for dealing with the extra numerical precision required for the result of an arithmetic operation in processors with no rounding support. The process 101 consists of multiple stages of operations, each using operands having a first number of valid bits (e.g., 16). The result of the operation is computed and represented using a second number of bits (e.g., 32), greater than the first number of bits. After each operation, rounding is performed in software by adding 0.5 to the result of the operation and truncating and/or shifting the result such that the result is represented using the first number of valid bits (e.g. 16). In other words, consider the placement of decimal point such that the result of operation is represented as X.Y, where X is the target precision portion of the result and Y is the excess precision portion. Software rounding produces floor(X.Y+0.5). More particularly, software rounding produces a number that is the largest integer not exceeding (X.Y+0.5). It can be shown that for Y uniformly distributed between 0 and 1, the expectation or average of X.Y-floor(X.Y+0.5) is zero, (i.e., no bias).

When multiple stages of operations are involved, the effect of bias will be amplified if the biases are allowed to accumulate. This may result in unacceptable computational error. While no bias is introduced in the quantization noise of the conventional method described above, extra processing is needed to implement the multiple precision arithmetic and software rounding. If the excess precision is provided by limiting the dynamic range of the operands (as opposed to multiple precision arithmetic), there will a loss of dynamic range and the extra processing associated with software rounding is still needed. When multiple stage operation is involved, the extra processing may become a significant burden to the microprocessor implementing these operations. Therefore a need exists for a method and apparatus for reducing computational error in a processor having no rounding support that does not require the extra processing needed with current techniques.

DETAILED DESCRIPTION OF THE PREFERRED EMBODIMENTS

In typical signal processing applications, an input data sequence is processed by a chain of signal processing operations to produce an output data sequence. Commonly used signal processing operations are of the linear time-invariant type in the sense that any bias or deterministic error introduced before an operation produces a deterministic error at the output of an operation. (A deterministic error is a type of error that does not depend on the data being operated on and remains constant over time. In a chain of linear time-invariant operations, all bias introduced between operations collectively produce a total deterministic error at the final output of the chain of operations.) In the present invention, truncation is used in place of rounding after each operation by simply not rounding in software, (i.e., not computing the result with any extra precision and not performing the software rounding). The result is equivalent to quantizing the result by zero forcing the bits to the right of the decimal point (without adding 0.5 first) and introducing a bias in addition to rounding error after each operation, as the result is effectively forced to be the largest integer not exceeding its true value (i.e., floor(X.Y) is less than X.Y on average). In fact, it is known that the bias is exactly −0.5. However, recognizing that all the bias introduced by replacing rounding with truncation results in a single deterministic error at the final output, in the present invention the total bias is predetermined and subtracted from each data sample of the final output sequence. This produces the same output data sequence as if rounding is applied after each operation, but without the computation burden of the multiple precision arithmetic and software rounding and without the potential loss of dynamic range associated with the conventional method described above.

The present invention encompasses a processor comprising a bias value table that stores pre-computed bias values for a chain of linear time-invariant operations. In the preferred embodiment of the present invention the pre-computed bias values are based on a difference between a true result of the linear time-invariant operations and an actual result of the linear time-invariant operations as computed by the processor.

The present invention additionally encompasses a method for reducing computational error in a microprocessor that does not have hardware for rounding support or a wider word-length accumulator that could be utilized for storing intermediate results. The method comprises the steps of receiving a set of input data, performing an operation on the input data using no rounding simulation, and determining a result of the operation. A table is accessed to determine a bias value for the operation, and the bias value is subtracted from the result of the operation in order to reduce computational error in the microprocessor.

Figure 2:
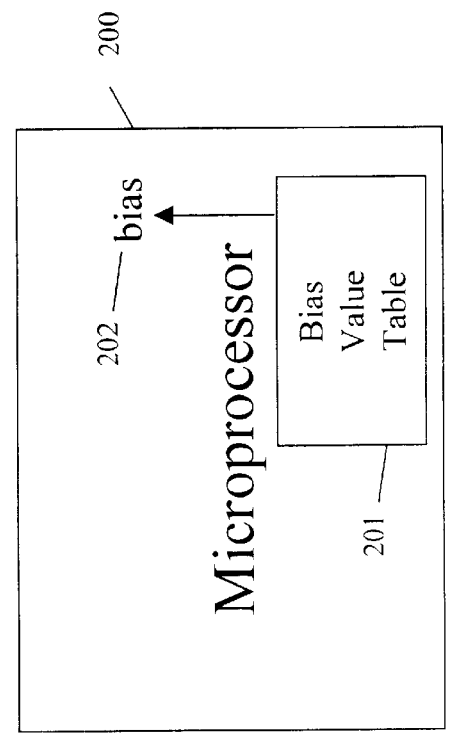
FIG. 2 is a block diagram of a microprocessor in accordance with the preferred embodiment of the present invention.

Turning now to the drawings, where like numerals designate like components, FIG. 2 is a block diagram of a processor in accordance with the preferred embodiment of the present invention. As shown, processor 200 comprises bias value table 201. Table 201 is incorporated into microprocessor 200 as part of internal memory, however one of ordinary skill in the art will recognize that table 201 may exist separate from microprocessor 200 as external memory. In the preferred embodiment of the present invention bias value table 201 contains pre-computed bias values for the final output from a chain of linear time-invariant operations. A bias value for a particular operation is the average error in the result of the operation. In other words, a bias value is the average difference between the true result of the linear time-invariant operation and the actual result computed by processor 200. The difference between the true and actual results is due to quantization as fewer than sufficient number of bits is used to represent the actual result.

In the preferred embodiment of the present invention, bias value table 201 contains bias values for specific operations involved in the application implemented by the microprocessor. For example, if the application implemented by the microprocessor is an N-point Fast Fourier Transform (FFT), bias table 201 will contain pre-computed bias values for the transform, more particularly, the bias value for each of the N outputs. As will be examined in further detail in conjunction with FIG. 3, the N point FFT consists of $\log_2(N)$ stages of "bufferfly" operations, each butterfly operation involves multiplication with a twiddle factor and requires quantization for the product. In addition, in order to avoid overflow, the input of each bufferfly operation is typically scaled down by ½ which requires another quantization. In accordance with the present invention truncation is used instead of rounding for these quantizations. A bias of −0.5 will be introduced with each operation whose result is quantized. However, due to the linear time-invariant nature of the FFT operation, the accumulative bias at the final output of the FFT is deterministic (i.e., the bias for the N outputs is a constant that does not depend on the input data to the FFT). Thus, instead of trying to correct for the bias after each operation, the accumulative bias for each of the N output is precomputed and stored in a size-N bias table 201 in accordance with the present invention. The stored bias value is subtracted from the corresponding output after all $\log_2(N)$ stages of bufferfly operations.

As another example, consider a microprocessor implementing a Discrete Multi-Tone (DMT) receiver such as an ADSL modem receiver. In a typical implementation, the received sample data are operated on by a time domain equalizer, an FFT and a frequency domain equalizer, in that order. Each of the three stages of operation may introduce bias if not corrected and each stage of operation may consist of multiple bias introducing substages as we have seen with the FFT operation. However, if all the operations are linear time-invariant, the cumulative bias at the output of the final stage of operation, the frequency domain equalizer in this particular case, will be a constant that does not depend on the received sample data.

Bias table 201 in this case will be populated with the pre-computed constant value for each of the cumulative biases. Instead of trying to avoid bias after each operation, the cumulative bias at the final output is removed by subtracting the value stored in bias table 201. It is noted that the equalizers in this example are typically of adaptive type such that they can track the variation in channel response. This type of equalizer is not strictly time-invariant, implying that it will introduce different bias values when its coefficients change. However, for a given set of coefficients, the bias is constant (i.e., independent of received data samples).

In the preferred embodiment, the content of bias table 201 needs to be recomputed upon a change in the equalizer coefficients. Alternatively, in some ADSL modem implementations, the time domain equalizer is non-adaptive or is adapted less frequently than the frequency domain equalizer. In this case, the chain of processing consists of the time domain equalizer and the FFT. The cumulative bias for the time domain equalizer and FFT can be pre-computed and subtracted from the outputs of the FFT. In general, when a chain of processing consists of time variant operations, the chain can be broken up into segments with only time invariant operations, and the present invention can be applied to each of these segments.

In accordance with the preferred embodiment of the present invention, truncation is used at each operation, introducing the bias at each operation. However, instead of correcting for the bias after each operation (i.e., instead of simulating rounding in software by adding 0.5 to the result of each operation before truncating), the cumulative bias of all operations 401 is pre-computed and stored in a bias memory 201. Pre-computed bias 202 is then subtracted from the output of the final operation to yield a final result that is free of bias.

By pre-computing bias values for an operation, and adding the total bias value to the result of the operation, a more accurate result may be obtained without the extra processing needed with prior-art techniques. The complexity savings comes from two factors. Firstly, subtracting a bias value stored in a table requires simpler processing than the software simulated rounding required by the conventional method. As described above, the software simulated rounding involves multiple precision arithmetic and performing the rounding operation in software. Secondly, a single subtraction operation replaces a large number of simulated rounding operations. As will be shown below for the FFT example given above, $1.5*\log_2(N)$ such operations are replaced by a single subtraction. In the ADSL modem example, even more complexity saving are achieved by eliminating more simulated rounding operations.

Figure 3:
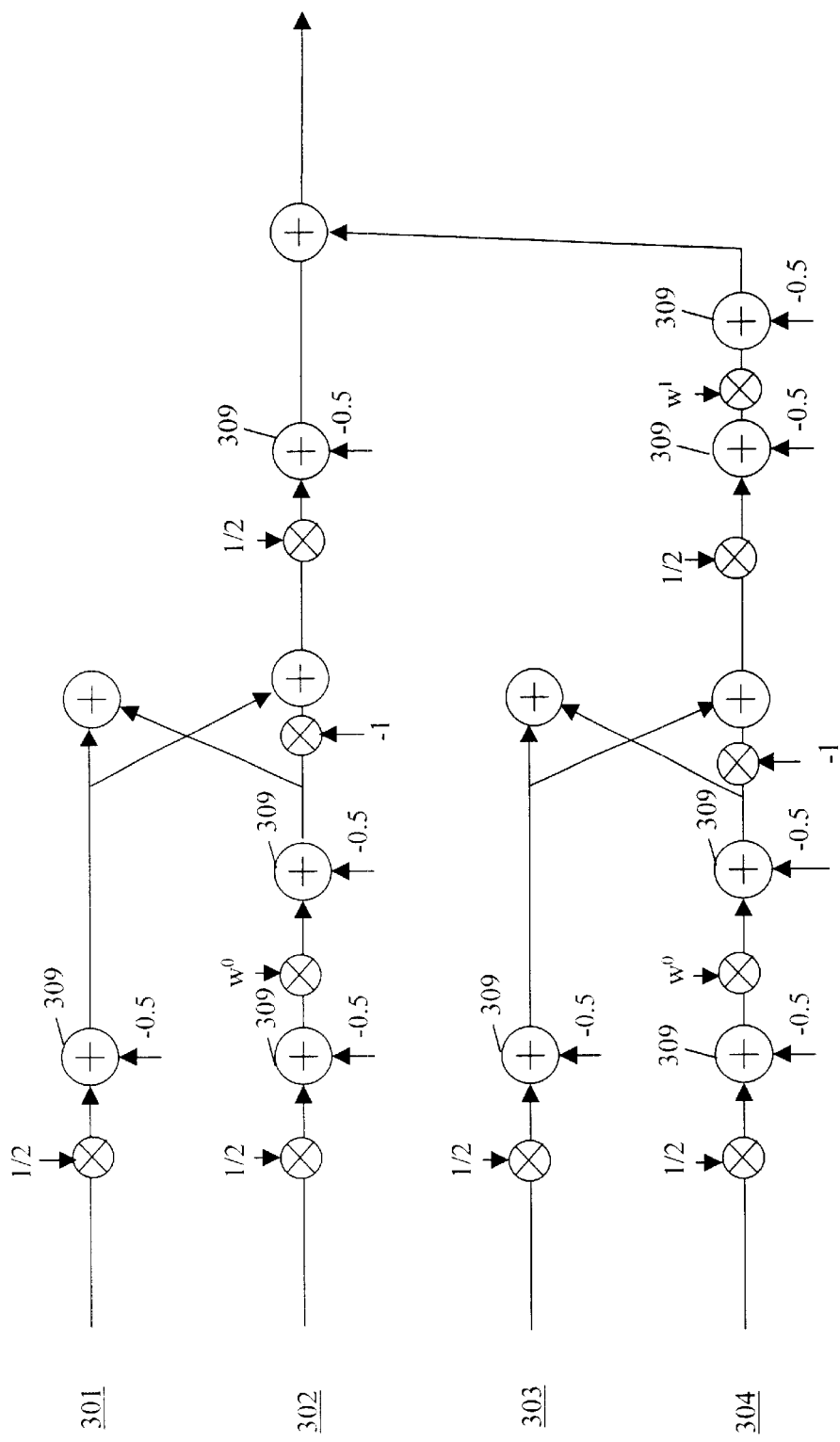
FIG. 3 illustrates the calculation of a bias value in accordance with the preferred embodiment of the present invention.

FIG. 3 illustrates the calculation of a bias value in accordance with the preferred embodiment of the present invention. In this particular example, a single leg of a 4-point (N=4) FFT process is shown, however one of ordinary skill in the art will recognize that any process may be substituted for the FFT process, as long as the bias is not a function of any input values. As is evident, multiple inputs 301–304 are acted on by various addition and multiplication operations to complete the FFT. The introduction of bias is shown as addition of −0.5 by adders 309 after each multiplication operation (except multiplication by −1 which does not require extra precision to represent the product). In the preferred embodiment of the present invention the accumulative bias at the FFT output does not depend on the input data (i.e., it is a constant for each particular FFT output). The constant accumulative bias for any computation can be calculated by finding 1) the biased final output value and 2) the true value of the output driven by a common set of inputs. It is typically convenient to select all-zero input as the common set. The biased final output value for all-zero input can be determined by forcing the input data 301–304 to be all zeros, applying a −0.5 bias at each of the bias source and calculating the actual final output value. The true value of the output for all-zero input can be determined by numerically computing the output using sufficiently high numerical precision. Alternatively, the true output value can often be obtained from the understanding of the nature of the computation. In our FFT example, the all-zero input should generate all-zero outputs. The constant accumulative bias is the difference between the biased final output and the true value of the output. In the case of FIG. 3, the constant bias at the FFT output shown in FIG. 3 can be evaluated by determining the biased output value given all-zero intputs (301–304). This amounts to summing the contribution from each of the nine bias sources as, $$\text{Bias} = -0.5*(\tfrac{1}{2})$$

$$-0.5*(\tfrac{1}{2})* w^0 + 0.5*(\tfrac{1}{2}) - 0.5$$

$$0.5*(\tfrac{1}{2})*w^1 + 0.5*(\tfrac{1}{2})*w^1 + 0.5*(\tfrac{1}{2})*w^1 - 0.5*w^1 - 0.5$$

where, $w^k = \exp-(j2\pi k/N)$ is the twiddle factor.

The cumulative bias will be pre-computed and stored in table 201. During data processing, the simulated rounding operation in each stage will not be performed (i.e., the product of every multiplication operation is computed for target precision directly as opposed to computing the product with excess precision, adding 0.5 and truncating to the target precision), but the final output will be corrected by subtracting the stored cumulative bias from the end result. It is clear that the result is equivalent to applying a rounding operation at each stage. Since there are $\log_2(N)$ stages of butterfly in an N point FFT and each stage has N scaling by ½ and N/2 twiddle factor multiplications, amounting to 3N/2 bias sources, $1.5*\log_2(N)$ rounding operations will need to be performed per output if correction is applied for each quantization. For large N, significant savings can be achieved by removing the accumulative bias with a single subtraction in accordance with the present invention.

Figure 1:
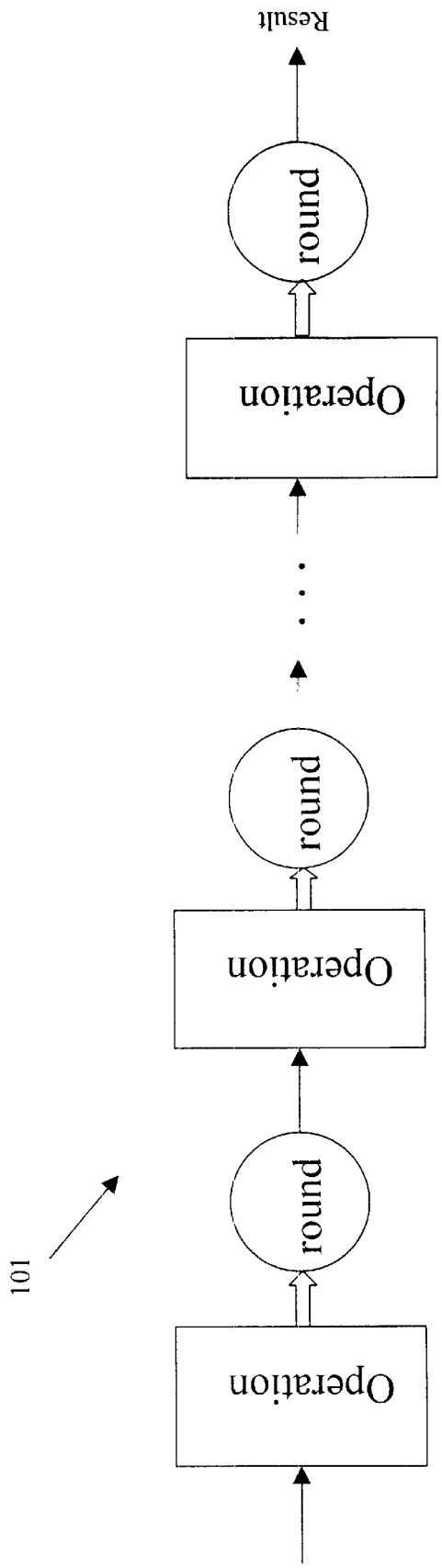
FIG. 1 illustrates a prior-art method for performing a chain of numeric operations that require extra numeric precision for the results.
Figure 4:
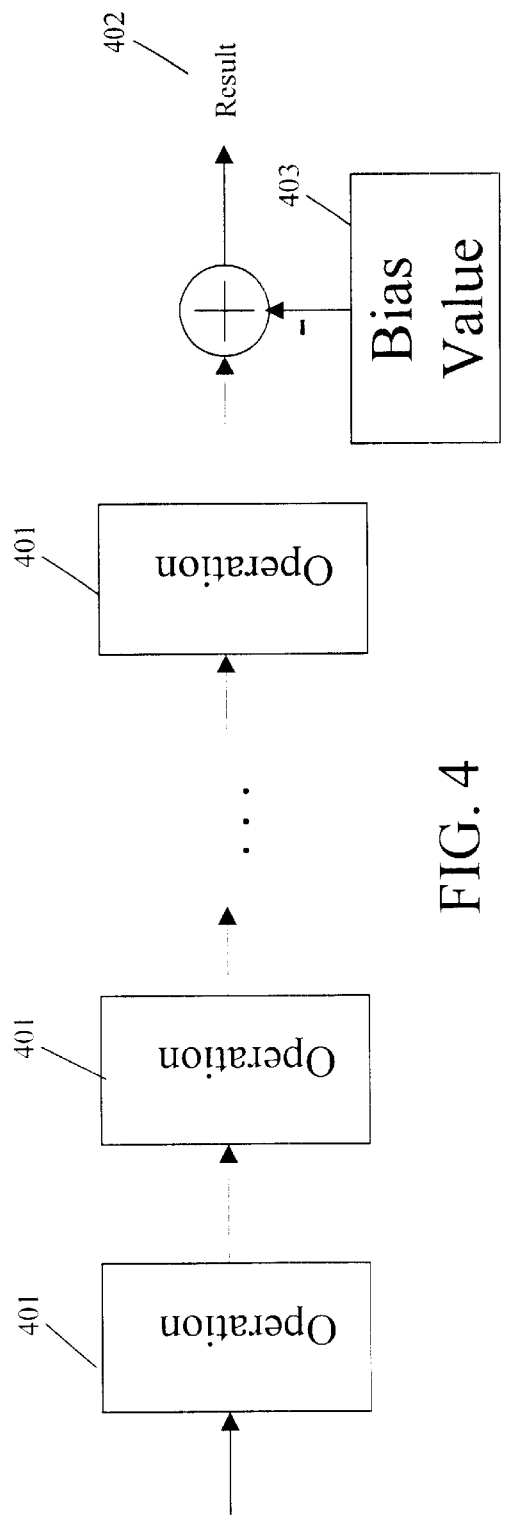
FIG. 4 illustrates a method for performing a chain of numeric operations that require extra numeric precision for the results in accordance with the preferred embodiment of the present invention.

FIG. 4 illustrates a method for performing a numeric operation that requires extra numeric precision for the result in accordance with the preferred embodiment of the present invention. In the preferred embodiment of the present invention bias value 403 is subtracted from the output of the final operation in order to accommodate for the computational error introduced at each operation 401. In accordance with the preferred embodiment of the present invention truncation is used at each operation, introducing the bias at each operation. The accumulative bias of all operations 401 is pre-computed and stored in a bias memory. Pre-computed bias 403 is subtracted from the output of the final operation to yield a final result that is free of bias.

To show the need for bias correction, denote the input as s and bias introduced from each operation as b, also denote each operation as $H_0$, $H_1$, and $H_{K-1}$. The desired (true) final output is then $H_{K-1} \ldots H_1 H_0(s)$, and the accumulative bias is $H_{K-1} \ldots H_2 H_1(b) \ldots + H_{K-1}(b) + b$. If it is assumed that all operations are power preserving (i.e., the output signal power of each operation approximately equals its input signal power), then the output signal power would be the power of s and the noise power due to bias would be K times the power of b if the bias accumulates randomly and can be up to $K^2$ times the power of b if the bias accumulates constructively. This implies the output signal to noise ratio is typically K and can be $K^2$ times worse than the signal to noise ratio due to the bias from a single source. In other words, for computations that involve a large number of stages of processing (large K), the error due to bias will be amplified. Thus it is important to remove the accumulative bias in the final output instead of simply replacing rounding with truncation in favor of computation complexity.

Figure 5:
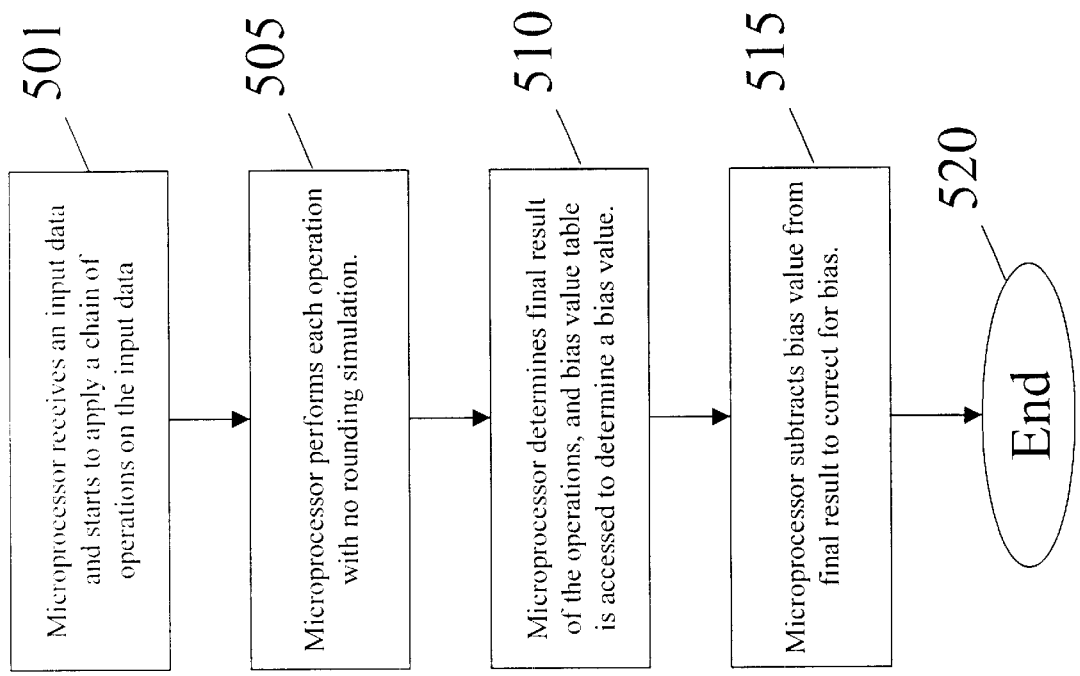
FIG. 5 is a flow chart showing operation of the microprocessor of FIG. 2 in accordance with the preferred embodiment of the present invention.

FIG. 5 is a flow chart showing operation of the microprocessor of FIG. 2 in accordance with the preferred embodiment of the present invention. As discussed above, microprocessor 200 does not have hardware for rounding support, or the ability for utilizing a wider word length accumulator for storing intermediate results. Instead of simulating rounding by truncating the sum of 0.5 and the result of an operation computed with excess precision, in the preferred embodiment of the present invention a total bias value is subtracted from the result of the operation.

The logic flow begins at step 501 where microprocessor 200 receives an input data and starts to apply at least one operation (e.g., a multiplication operation). However, at step 501 processor 200 can receive a plurality of input data and perform a plurality of operations (e.g., multiple stages of butterfly operations as in FFT) to the input data. At step 505 each stage of operation is performed by computing the result for the target precision directly with no rounding simulation. In other words, the operation is performed without excess precision and without adding 0.5 to the result of each operation before truncating to the target precision. At step 510 a final result of the chain of operation is determined, and table 201 is accessed to determine a bias value for the entire operation (e.g., FFT operation). In particular, table 201 is accessed with an output index, and microprocessor 200 is returned a total bias value for the particular output. Finally, at step 515, the bias value is subtracted from the result of the operation in order to correct for bias. The logic flow then ends at step 520.

The invention, in its broader aspects, is not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. A processor comprising a bias value table storing pre-computed bias values for a chain of linear time-invariant operations, wherein the pre-computed bias values are based on a difference between a true result of the linear time-invariant operations and an actual result of the linear time-invariant operations as computed by the processor.

2. The processor of claim 1 wherein the bias value table stores pre-computed bias values for an N-point Fast Fourier Transform.

3. The processor of claim 1 wherein the bias value table stores pre-computed bias values for a Fast Fourier Transform and a frequency domain equalizer.

4. The processor of claim 1 further comprising an adder for subtracting the bias value from the actual result of the linear time-invariant operation as computed by the processor.

5. The processor of claim 1 wherein the bias value table is incorporated into the processor as part of an internal or external memory.

6. A method for reducing computational error in a microprocessor that does not have hardware for rounding support or an ability for utilizing a wider word-length accumulator for storing intermediate results, the method comprising the steps of:

receiving an input data;

performing an operation on the input data using no rounding simulation;

determining a result of the operation;

accessing a table to determine a bias value for the operation; and subtracting the bias value from the result of the operation in order to reduce computational error in the microprocessor.

7. The method of claim 6 wherein the step of receiving the input data comprises the step of receiving a plurality of input data.

8. The method of claim 7 wherein the step of performing the operation comprises the steps of performing a plurality of operations.

9. The method of claim 6 wherein the step of performing the operation comprises the step of performing a Fast Fourier Transform operation.

10. The method of claim 6 wherein the step of accessing the table comprises the step of accessing an internal memory.

* * * * *